(12) United States Patent
Chu et al.

(10) Patent No.: US 11,250,438 B2
(45) Date of Patent: Feb. 15, 2022

(54) BLOCKCHAIN-BASED REIMBURSEMENT SPLITTING

(71) Applicant: Advanced New Technologies Co., Ltd., George Town (KY)

(72) Inventors: Yu Chu, Hangzhou (CN); Longsheng Qing, Hangzhou (CN); Ge Jin, Hangzhou (CN); Zhenzhong Meng, Hangzhou (CN); Xueqing Yang, Hangzhou (CN); Zhen Sun, Hanzghou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 16/779,449

(22) Filed: Jan. 31, 2020

(65) Prior Publication Data

US 2020/0286090 A1  Sep. 10, 2020

Related U.S. Application Data

(63) Continuation of application No. PCT/CN2020/071994, filed on Jan. 14, 2020.

(30) Foreign Application Priority Data

Jul. 31, 2019 (CN) .......................... 201910703762.0

(51) Int. Cl.
*G06Q 20/40* (2012.01)
*G06Q 20/38* (2012.01)
*H04L 9/06* (2006.01)

(52) U.S. Cl.
CPC ....... *G06Q 20/405* (2013.01); *G06Q 20/3825* (2013.01); *G06Q 20/407* (2013.01); *H04L 9/0637* (2013.01)

(58) Field of Classification Search
None
See application file for complete search history.

(56) References Cited

U.S. PATENT DOCUMENTS 9,990,678 B1 *   6/2018  Cabrera ............... G06Q 40/123
10,068,228 B1    9/2018  Winklevoss et al.
(Continued)

FOREIGN PATENT DOCUMENTS

CN    104484824    4/2015
CN    104484882    4/2015
(Continued)

OTHER PUBLICATIONS

PCT International Search Report and Written Opinion in International Application No. PCT/CN2020/071994, dated Apr. 26, 2020, 14 pages (with partial machine translation).

(Continued)

*Primary Examiner* — Neha Patel
*Assistant Examiner* — Nicholas K Phan
(74) *Attorney, Agent, or Firm* — Fish & Richardson P.C.

(57) ABSTRACT

This disclosure relates to blockchain-based reimbursement. In some aspects, a network node on a blockchain network receives a target transaction. The target transaction includes a target electronic bill identifier. In response to receiving the target transaction, expense splitting logic is invoked. The expense splitting logic is specified in a smart contract deployed on the blockchain Respective expense splitting notes are generated based on the expense splitting logic and an unreimbursed amount included in reimbursement information that is stored in the blockchain and that corresponds to the target electronic bill identifier. The respective expense splitting notes are broadcasted to the blockchain for storage.

17 Claims, 7 Drawing Sheets

(56) References Cited

U.S. PATENT DOCUMENTS

| | | | | |
|---|---|---|---|---|
| 2004/0103088 | A1* | 5/2004 | Cragun | G06F 16/256 |
| 2013/0291060 | A1* | 10/2013 | Moore | G16H 40/63 |
| | | | | 726/1 |
| 2014/0100882 | A1 | 4/2014 | Hamilton et al. | |
| 2014/0310080 | A1 | 10/2014 | Salmon et al. | |
| 2015/0227890 | A1 | 8/2015 | Bednarek et al. | |
| 2019/0354966 | A1* | 11/2019 | Himura | G06Q 20/401 |
| 2020/0005912 | A1* | 1/2020 | Saliman | H04L 63/04 |
| 2020/0074450 | A1* | 3/2020 | Fletcher | H04L 9/3255 |
| 2020/0104177 | A1* | 4/2020 | Inokuchi | G06F 16/28 |
| 2020/0185070 | A1* | 6/2020 | Dahmani | G06Q 20/10 |
| 2020/0302407 | A1* | 9/2020 | Willis | G06Q 20/023 |

FOREIGN PATENT DOCUMENTS

| | | |
|---|---|---|
| CN | 106408421 | 2/2017 |
| CN | 106952153 | 7/2017 |
| CN | 107909456 | 4/2018 |
| CN | 109035019 | 12/2018 |
| CN | 109165957 | 1/2019 |
| CN | 109299907 | 2/2019 |
| CN | 109360077 | 2/2019 |
| CN | 110009435 | 7/2019 |
| CN | 110020900 | 7/2019 |
| CN | 110047008 | 7/2019 |
| CN | 110443612 | 11/2019 |
| TW | M561273 | 6/2018 |
| WO | WO 2018136059 | 7/2019 |

OTHER PUBLICATIONS

Crosby et al., "BlockChain Technology: Beyond Bitcoin," Sutardja Center for Entrepreneurship & Technology Technical Report, Oct. 16, 2015, 35 pages.

Nakamoto, "Bitcoin: A Peer-to-Peer Electronic Cash System," www.bitcoin.org, 2005, 9 pages.

* cited by examiner

BLOCKCHAIN-BASED REIMBURSEMENT SPLITTING

CROSS-REFERENCE TO RELATED APPLICATIONS

This application is a continuation of PCT Application No. PCT/CN2020/071994, filed on Jan. 14, 2020, which claims priority to Chinese Patent Application No. 201910703762.0, filed on Jul. 31, 2019, and each application is hereby incorporated by reference in its entirety.

TECHNICAL FIELD

One or more embodiments of the present specification relate to the field of blockchain technologies, and in particular, to blockchain-based reimbursement splitting.

BACKGROUND

Blockchain technology, also known as distributed ledger technology, is an emerging technology in which several computing devices participate in "record-keeping" and jointly maintain a complete distributed database. Since blockchain technology has the characteristics of decentralization, openness, and transparency, each computing device can participate in database records, and data can be quickly synchronized between computing devices, blockchain technology has been widely used in many fields.

SUMMARY

The present specification provides a blockchain-based reimbursement splitting method, where the method is applied to a node on the blockchain, and the method includes: receiving a target transaction, where the target transaction includes a target electronic bill identifier; invoking, in response to the target transaction, an expense splitting logic specified in a smart contract deployed on the blockchain, and generating respective expense splitting notes based on an unreimbursed amount included in reimbursement information that is stored in the blockchain and that corresponds to the target electronic bill identifier; and broadcasting the respective expense splitting notes to the blockchain for storage.

Optionally, the target transaction is an expense splitting transaction initiated by a reimbursement acceptor, and the blockchain stores reimbursement information of an electronic bill; and the generating respective expense splitting notes based on an unreimbursed amount included in reimbursement information that is stored in the blockchain and that corresponds to the target electronic bill identifier includes: searching for the reimbursement information that is stored in the blockchain and that corresponds to the target electronic bill identifier; and generating the respective expense splitting notes based on the unreimbursed amount in the found reimbursement information.

Optionally, the target transaction is a reimbursement transaction initiated by a reimbursement initiator, and the blockchain stores a target electronic bill corresponding to the reimbursement transaction; and the invoking, in response to the target transaction, an expense splitting logic specified in a smart contract deployed on the blockchain, and generating respective expense splitting notes based on an unreimbursed amount included in reimbursement information that is stored in the blockchain and that corresponds to the target electronic bill identifier includes: invoking, in response to the target transaction, a reimbursement logic specified in the smart contract deployed on the blockchain to determine whether the target electronic bill satisfies reimbursement criteria; if the target electronic bill satisfies the reimbursement criteria, generating a reimbursable event that the target electronic bill satisfies the reimbursement criteria, and broadcasting the reimbursable event to the blockchain for storage, so when monitoring the reimbursable event stored in the blockchain, a reimbursement acceptor performs reimbursement processing on the target electronic bill and broadcasts the reimbursement information to the blockchain for storage; and further invoking, in response to monitoring the reimbursement information stored in the blockchain, the expense splitting logic specified in the smart contract deployed on the blockchain, and generating the respective expense splitting notes based on the unreimbursed amount included in the reimbursement information.

Optionally, the method further includes: if the reimbursement information stored in the blockchain is not monitored within predetermined monitoring duration, returning prompt information indicating a reimbursement failure to the reimbursement acceptor.

Optionally, the method further includes: if the target electronic bill does not satisfy the reimbursement criteria, returning prompt information indicating a reimbursement failure to the reimbursement acceptor.

The present specification further provides a blockchain-based reimbursement splitting apparatus, where the apparatus is applied to a network node on the blockchain, and the apparatus includes: a receiving unit, configured to receive a target transaction, where the target transaction includes a target electronic bill identifier; an invoking unit, configured to: invoke, in response to the target transaction, an expense splitting logic specified in a smart contract deployed on the blockchain, and generate respective expense splitting notes based on an unreimbursed amount included in reimbursement information that is stored in the blockchain and that corresponds to the target electronic bill identifier; and a broadcasting unit, configured to broadcast the respective expense splitting notes to the blockchain for storage.

Optionally, the target transaction is an expense splitting transaction initiated by a reimbursement acceptor, and the blockchain stores reimbursement information of an electronic bill; and the invoking unit is configured to search for the reimbursement information that is stored in the blockchain and that corresponds to the target electronic bill identifier; and generate the respective expense splitting notes based on the unreimbursed amount in the found reimbursement information.

Optionally, the target transaction is a reimbursement transaction initiated by a reimbursement initiator, and the blockchain stores a target electronic bill corresponding to the reimbursement transaction; and the invoking unit is configured to: invoke, in response to the target transaction, a reimbursement logic specified in the smart contract deployed on the blockchain to determine whether the target electronic bill satisfies reimbursement criteria; if the target electronic bill satisfies the reimbursement criteria, generate a reimbursable event that the target electronic bill satisfies the reimbursement criteria, and broadcast the reimbursable event to the blockchain for storage, so when monitoring the reimbursable event stored in the blockchain, a reimbursement acceptor performs reimbursement processing on the target electronic bill and broadcasts the reimbursement information to the blockchain for storage; and further invoke, in response to monitoring the reimbursement information stored in the blockchain, the expense splitting logic specified in the smart contract deployed on the blockchain, and generate the respective expense splitting notes based on the unreimbursed amount included in the reimbursement information.

Optionally, the invoking unit is configured to: if the reimbursement information stored in the blockchain is not monitored within predetermined monitoring duration, return prompt information indicating a reimbursement failure to the reimbursement acceptor.

Optionally, the invoking unit is configured to: if the target electronic bill does not satisfy the reimbursement criteria, return prompt information indicating a reimbursement failure to the reimbursement acceptor.

The present specification further provides an electronic device, including: a processor; and a memory, configured to store machine executable instructions; where by reading and executing the machine executable instructions that are stored in the memory and that are corresponding to a control logic of block-chain-based reimbursement splitting, the processor is enabled to: receive a target transaction, where the target transaction includes a target electronic bill identifier; invoke, in response to the target transaction, an expense splitting logic specified in a smart contract deployed on the blockchain, and generate respective expense splitting notes based on an unreimbursed amount included in reimbursement information that is stored in the blockchain and that corresponds to the target electronic bill identifier; and broadcast the respective expense splitting notes to the blockchain for storage.

It can be seen from the previous description that, the network node on the blockchain can invoke, in response to the target transaction that includes the target electronic bill identifier, the expense splitting logic specified in the smart contract deployed on the blockchain, and generate the respective expense splitting notes based on the unreimbursed amount included in the reimbursement information that is stored in the blockchain and that corresponds to the target electronic bill identifier, so the user can independently issue the respective expense splitting notes by invoking the smart contract on the blockchain.

DESCRIPTION OF EMBODIMENTS

Figure 1:
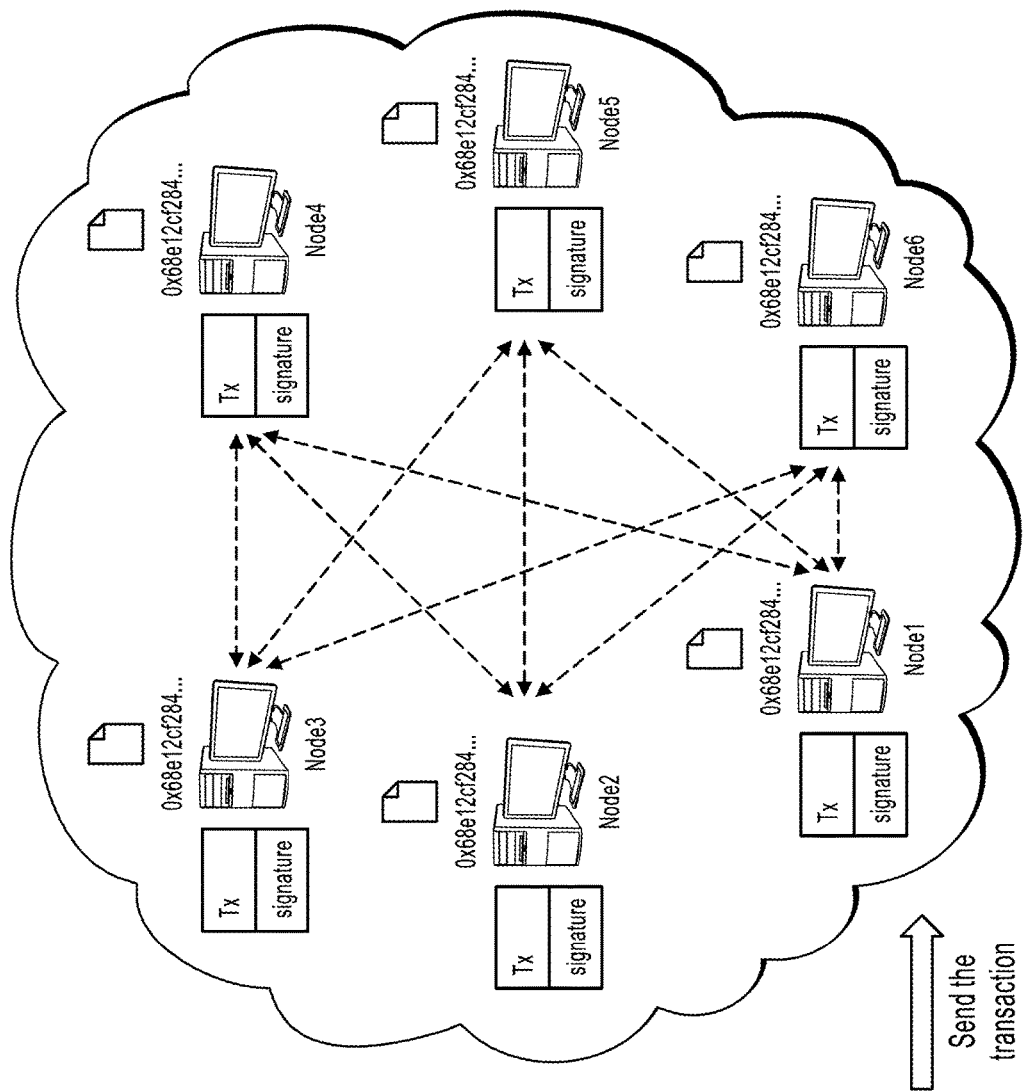
FIG. 1 is a schematic diagram of creating a smart contract, according to an example embodiment of the present specification.
Figure 1:
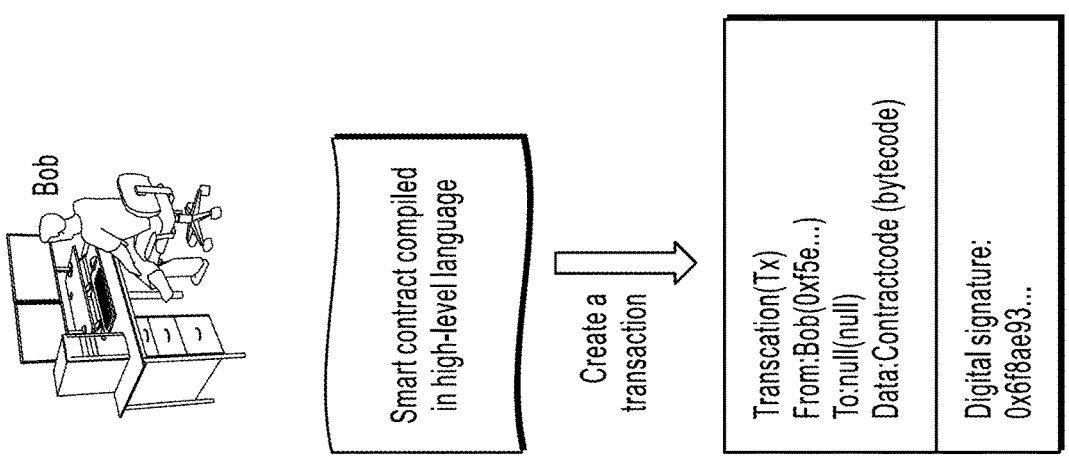

Example embodiments are described in detail here, and examples of the example embodiments are presented in the accompanying drawings. When the following description relates to the accompanying drawings, unless specified otherwise, same numbers in different accompanying drawings represent same or similar elements. Example embodiments described in the following do not represent all embodiments consistent with the present specification. On the contrary, the embodiments are only examples of apparatus and methods that are described in the appended claims in detail and consistent with some aspects of the present specification.

It is worthwhile to note that, in other embodiments, steps of a corresponding method are not necessarily performed according to a sequence shown and described in the present specification. In some other embodiments, the method can include more or less steps than those described in the present specification. In addition, a single step described in the present specification can be broken down into multiple steps in other embodiments for description. However, the multiple steps described in the present specification can also be combined into a single step for description in other embodiments.

Blockchains can generally be classified into three types: public blockchains, private blockchains, and consortium blockchains. In addition, there are several types of combinations, such as private blockchain+consortium blockchain and consortium blockchain+public blockchain.

The public blockchain has the highest degree of decentralization. The public blockchain is represented by Bitcoin and Ethereum. Participants (also referred to as blockchain nodes) who join the public blockchain can read on-chain data records, participate in transactions, and compete for accounting rights of new blocks. In addition, each node can freely join or exit a network and perform related operations.

On the contrary, a write right of the private blockchain network is controlled by a certain organization or institution, and a data reading right is specified by the organization. In short, the private blockchain can be a weak centralization system, and participating nodes are strictly limited and rare. This type of blockchain is more suitable for internal use within a specific organization.

The consortium blockchain is a blockchain balanced between the public blockchain and the private blockchain, and can be "partially decentralized". Each node in the consortium blockchain usually has a corresponding entity institution or organization. Nodes join the network through authorization and form interest-related consortiums to jointly maintain blockchain operation.

Based on the basic characteristics of the blockchain, the blockchain usually consists of several blocks. Timestamps corresponding to creation moments of these blocks are separately recorded in these blocks, and all the blocks strictly form a time-ordered data chain based on the timestamps recorded in the blocks.

For real data generated in the physical world, the data can be formed into a standard transaction format supported by the blockchain, and then broadcasted to the blockchain. Network nodes in the blockchain perform consensus processing on the received transaction. After the consensus is reached, a network node serving as a bookkeeping node in the blockchain seals the transaction into a block and persistently stores the transaction in the blockchain.

Consensus algorithms supported in the blockchain can include: a first-type consensus algorithm where a network node needs to compete for the bookkeeping right in each round of bookkeeping, such as Proof of Work (POW), Proof of Stake (POS), and Delegated Proof of Stake (DPOS); a second-type consensus algorithm where a bookkeeping node is elected in advance for each round of bookkeeping (there is no need to compete for the bookkeeping right), such as a Practical Byzantine Fault Tolerance (PBFT).

In a blockchain network using the first-type consensus algorithm, all network nodes that compete for the bookkeeping right can execute a transaction after receiving the transaction. One of the network nodes that compete for the bookkeeping right can prevail in a current round and become the bookkeeping node. The bookkeeping node can seal a received transaction with other transactions to generate a latest block, and send the generated latest block or a block header of the latest block to other network nodes for reaching consensus.

In a blockchain network using the second-type consensus algorithm, a network node having the bookkeeping right has been agreed upon before the current round of bookkeeping. Therefore, after receiving a transaction, a network node can send the transaction to the bookkeeping node if the network node is not the bookkeeping node of the current round. The bookkeeping node in the current round can execute the transaction when or before sealing the transaction with other transactions to generate a latest block. After generating the latest block, the bookkeeping node can send the latest block or a block header of the latest block to other network nodes for reaching consensus.

As described above, regardless of which consensus algorithm is used in the blockchain, the bookkeeping node in the current round can seal the received transaction to generate the latest block, and send the generated latest block or the block header of the latest block to other network nodes for consensus verification. After receiving the latest block or the block header of the latest block, if the other network nodes verify that the latest block is correct, the other network nodes can append the latest block to the end of the original blockchain, so as to complete a bookkeeping process of the blockchain. In the process of verifying a new block or block header from the bookkeeping node, the other nodes can also execute a transaction included in the block.

In practice, the smart contract function can be provided for public, private, and consortium blockchains. The smart contract on the blockchain is a contract that can be triggered by a transaction on the blockchain. The smart contract is defined in the form of codes.

Taking Ethereum as an example, users can create and invoke some complex logics in the Ethereum network. An Ethereum virtual machine (EVM) is the core of Ethereum, which is a programmable blockchain, and each Ethereum node can run the EVM. The EVM is a Turing-complete virtual machine, through which various complex logics can be implemented. The user broadcasts and invokes the smart contract actually on the EVM in the Ethereum. In fact, the EVM directly runs virtual machine codes (virtual machine bytecode, "bytecode" for short), so the smart contract deployed on the blockchain can be bytecodes.

As shown in FIG. 1, after Bob sends a transaction containing information about creating a smart contract to the Ethereum network, an EVM of node 1 can execute the transaction and generate a corresponding contract instance. "0x68e12cf284 . . . " represents the address of the contract. Contract codes saved in a field value of the Data field of the transaction can be bytecodes. A field value of the To field of the transaction is a null account. After a consensus is reached between nodes based on a consensus mechanism, the smart contract is successfully created. Subsequently, a user can invoke the smart contract.

After a smart contract is created, a contract account corresponding to the smart contract appears on the blockchain and has a specific address, and a contract code and account storage are stored in the account storage of the contract account. The behavior of the smart contract is controlled by the contract code, and the account storage of the smart contract keeps the contract status. In other words, the smart contract causes a virtual account including the contract codes and account storage to be generated on the blockchain.

As mentioned above, the Data field of the transaction containing information about creating a smart contract can store the bytecodes of the smart contract. The bytecode consists of a series of bytes. Each byte can identify one operation. Based on development efficiency, readability, etc., developers could not write bytecodes directly, but choose high-level languages to write smart contract codes. For example, the high-level languages can be Solidity, Serpent, LLL, etc. For smart contract codes compiled in high-level languages, bytecodes that can be deployed on the blockchain can be generated through compiling by a compiler.

The Solidity language is used as an example. Contract codes compiled by using the Solidity language are similar to the Class in an object-oriented programming language. Multiple members can be specified in a contract, including a status variable, a function, a function modifier, an event, etc.

The status variable is a value that is permanently stored in the account storage field of the smart contract and is used to store the status of the contract.

Figure 2:
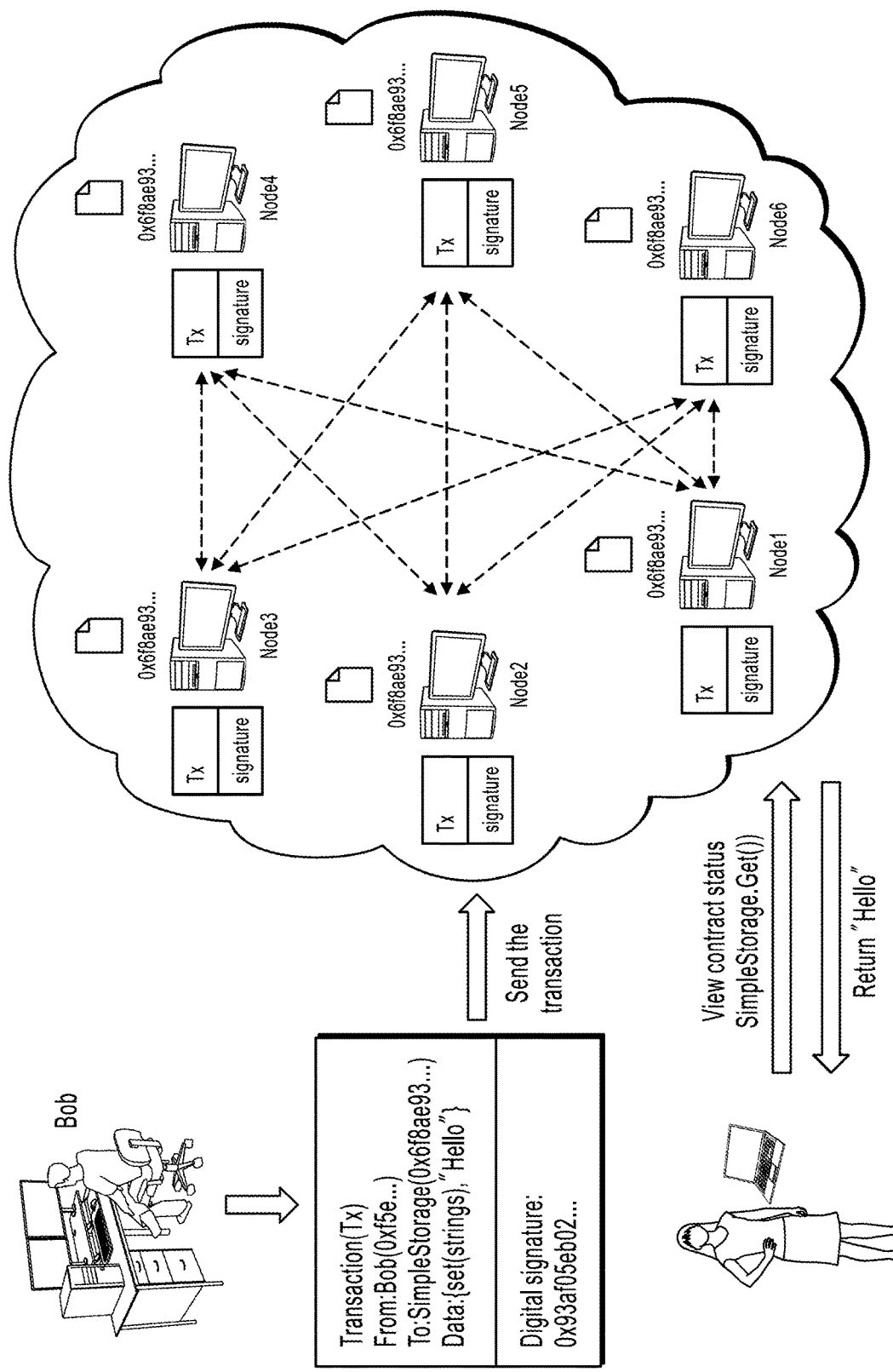
FIG. 2 is a schematic diagram of invoking a smart contract, according to an example embodiment of the present specification.
Figure 3:
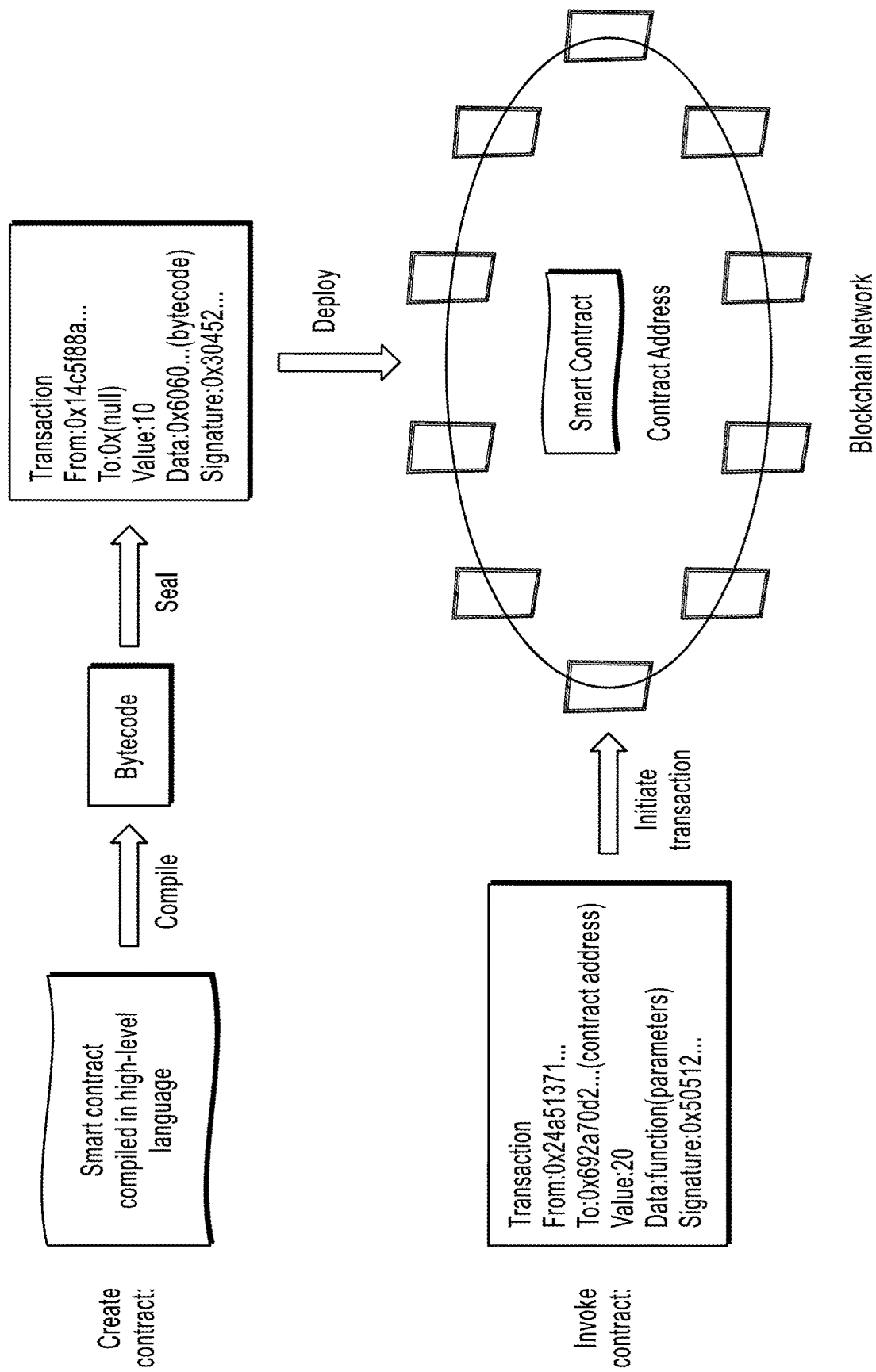
FIG. 3 is a schematic diagram of creating and invoking a smart contract, according to an example embodiment of the present specification.

As shown in FIG. 2, Ethereum is still used as an example. After Bob sends a transaction containing information about invoking a smart contract to the Ethereum network, the EVM of node 1 can execute the transaction and generate a corresponding contract instance. In FIG. 2, the From field of the transaction is used to record an address of an account that initiates the invoking of the smart contract, the To field is used to record an address of the invoked smart contract, and the Data field of the transaction is used to record a method and a parameter for invoking the smart contract. After the smart contract is invoked, the account status of the contract account can change. Subsequently, a certain client can view the account status of the contract account by using an accessed blockchain node (for example, node 1 in FIG. 2).

The smart contract can be executed independently on each node in the blockchain network in a specified method, and all execution records and data are stored in the blockchain. Therefore, after such a transaction is executed, transaction vouchers that cannot be tampered with and will not be lost are stored in the blockchain.

A schematic diagram of creating a smart contract and invoking a smart contract is shown in FIG. 2. Creating a smart contract in Ethereum requires the following processes: compiling the smart contract, changing the smart contract into bytecodes, and deploying the bytecodes to the blockchain. Invoking a smart contract in Ethereum means initiating a transaction pointing to a smart contract address. An EVM of each node can separately execute the transaction, and smart contract codes are distributed on a virtual machine of each node in the Ethereum network.

As service scenarios of the blockchain become increasingly rich, in addition to services related to value transfer, such as transfer, more and more blockchain projects begin to introduce conventional service scenarios that are not related to value transfer. For example, a service system can be interconnected with a service blockchain to implement conventional service scenarios such as issuance and reimbursement of electronic bills on the service blockchain.

In conventional electronic bill reimbursement scenarios, when a reimbursement amount in an electronic bill needs to be jointly borne by at least two reimbursement acceptors, for the same electronic bill, a user often needs to apply to multiple reimbursement acceptors for reimbursement. Each time the user applies to a reimbursement acceptor and completes the reimbursement of a portion of the reimbursement amount in the electronic bill, the reimbursement acceptor needs to issue a corresponding expense splitting note for the user based on a remaining unreimbursed amount, so the user can continue to complete the reimbursement of the unreimbursed portion based on the expense splitting note.

For example, in the medical reimbursement field, a reimbursement amount in a medical reimbursement bill needs to be shared by a healthcare security bureau and at least one insurance institution. For the same medical reimbursement bill, a user usually applies to the healthcare security bureau and the at least one insurance institution for reimbursement. Each time the user applies to the healthcare security bureau or the insurance institution for reimbursement and completes the reimbursement of a portion of the reimbursement amount in the medical reimbursement bill, the healthcare security bureau or the insurance institution needs to issue a corresponding expense splitting note for the user based on a remaining unreimbursed amount, so the user can continue to complete the reimbursement of the unreimbursed portion based on the expense splitting note.

Based on this, the present application is intended to provide a technical solution for automatically generating respective expense splitting notes based on an unreimbursed amount included in reimbursement information stored in a blockchain.

During specific implementation, when receiving a target transaction that includes a target electronic bill identifier, a network node on a blockchain can invoke, in response to the target transaction, an expense splitting logic specified in a smart contract deployed on the blockchain, and generate respective expense splitting notes based on an unreimbursed amount included in reimbursement information that is stored in the blockchain and that corresponds to the target electronic bill identifier; and broadcast the respective expense splitting notes to the blockchain for storage.

It can be seen from the previous description that, the network node on the blockchain can invoke, in response to the target transaction that includes the target electronic bill identifier, the expense splitting logic specified in the smart contract deployed on the blockchain, and generate the respective expense splitting notes based on the unreimbursed amount included in the reimbursement information that is stored in the blockchain and that corresponds to the target electronic bill identifier, so the user can independently issue the respective expense splitting notes by invoking the smart contract on the blockchain.

In addition, the blockchain is used to associate electronic bills, reimbursement information, and expense splitting notes used by the user to apply to each reimbursement acceptor for reimbursement, so a reimbursement track of the user can be traced on the blockchain.

Figure 4:
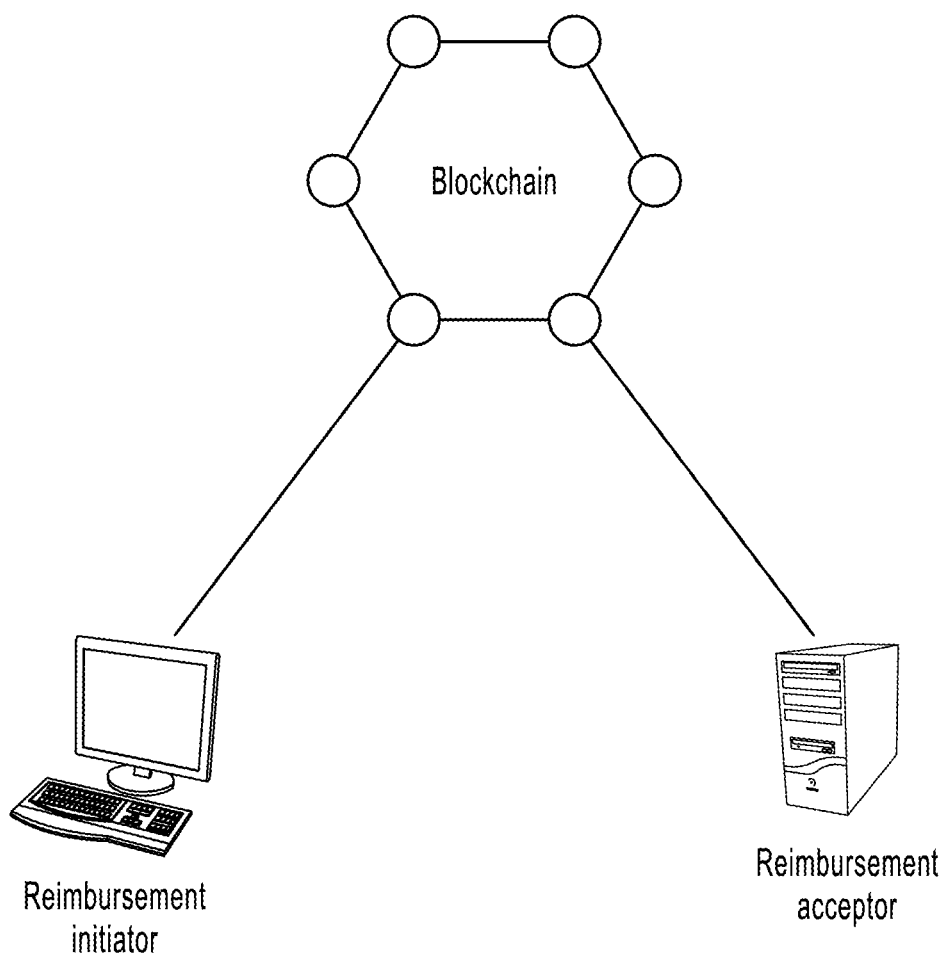
FIG. 4 is a schematic diagram illustrating a blockchain-based reimbursement splitting system, according to an example embodiment of the present specification.

Referring to FIG. 4, FIG. 4 is a schematic diagram illustrating a blockchain-based reimbursement splitting system, according to an example embodiment of the present specification.

The blockchain-based reimbursement splitting system includes a blockchain, a reimbursement acceptor, and a reimbursement initiator.

The previous reimbursement acceptor refers to an organization that can perform reimbursement processing. For example, in the field of medical reimbursement, the reimbursement acceptor can be a healthcare security bureau or an insurance company, etc. For example, in the field of vehicle insurance reimbursement, the reimbursement acceptor can be a vehicle insurance institution. These are merely examples of the reimbursement acceptor, and the reimbursement acceptor is not specifically limited.

The previous reimbursement initiator refers to a user terminal that can initiate reimbursement. For example, in the field of medical reimbursement, the reimbursement initiator can be a user terminal of a user who needs to perform medical reimbursement.

The blockchain described in the present specification can specifically include any type of blockchain network. In practice, any one of a public blockchain, a private blockchain, or a consortium blockchain can be used. The blockchain described in the present specification is described in the previous description, and details are omitted here.

Figure 5:
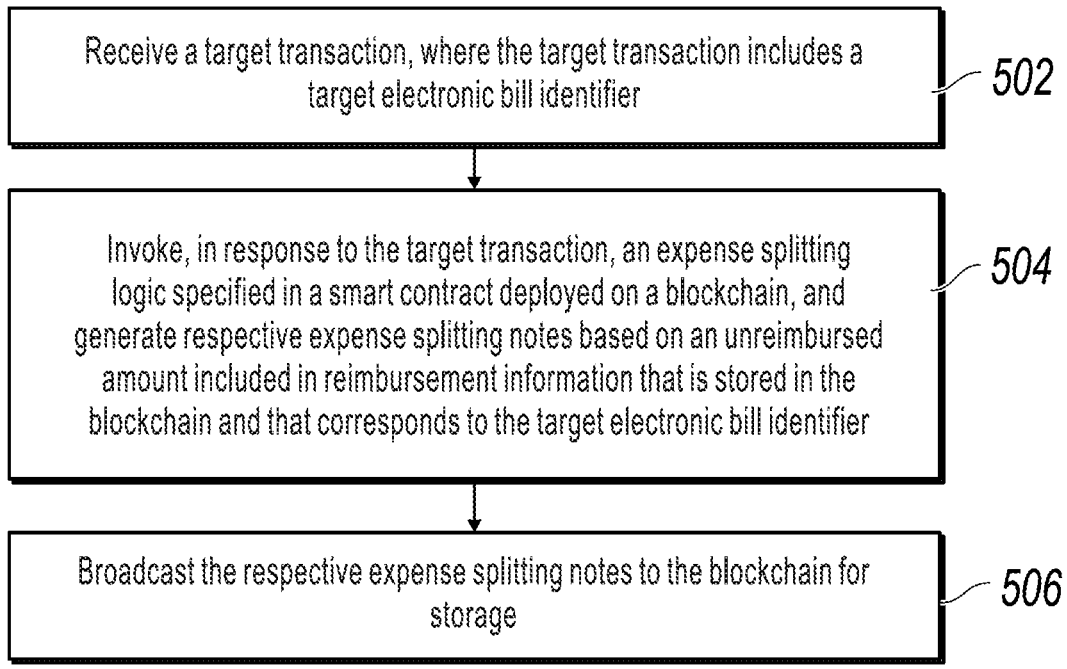
FIG. 5 is a flowchart illustrating a blockchain-based reimbursement splitting method, according to an example embodiment of the present specification.

Referring to FIG. 5, FIG. 5 is a flowchart illustrating a blockchain-based reimbursement splitting method, according to an example embodiment of the present specification. The method can be applied to a network node on a blockchain, and can include the following steps.

Step 502: Receive a target transaction, where the target transaction includes a target electronic bill identifier.

Step 504: Invoke, in response to the target transaction, an expense splitting logic specified in a smart contract deployed on the blockchain, and generate respective expense splitting notes based on an unreimbursed amount included in reimbursement information that is stored in the blockchain and that corresponds to the target electronic bill identifier.

Step 506: Broadcast the respective expense splitting notes to the blockchain for storage.

The previous expense splitting note includes an unreimbursed amount, and the expense splitting note is the basis for performing reimbursement by a next reimbursement acceptor.

For example, assume that the total amount to be reimbursed is RMB 100, and the user has received a reimbursement of RMB 40 from the healthcare security bureau, the generated expense splitting note records the unreimbursed amount of RMB 60. Then, the user can use the expense splitting note to demand the unreimbursed amount from the insurance institution, and the insurance institution can reimburse the users for the unreimbursed RMB 60 recorded in the expense splitting note.

The above electronic bill is an electronic certificate. For example, in the field of medical reimbursement, the electronic bill is a medical reimbursement note. In the field of vehicle insurance, the electronic bill can be an insurance claim form etc. These are merely examples of the electronic bill, and the electronic bill is not specifically limited.

For the process of creating the previous smart contract, refer to the process of creating the smart contract shown in FIG. 1. The Data field in the transaction for creating the smart contract information stores the expense splitting logic. Details are omitted here.

In this embodiment, the previous target transaction can be an expense splitting transaction sent by the reimbursement acceptor. After monitoring the expense splitting transaction, a network node on the blockchain can automatically generate respective expense splitting notes. Certainly, the previous target transaction can also be a reimbursement transaction initiated by the reimbursement initiator. After receiving the reimbursement transaction, the network node on the blockchain performs reimbursement verification on the target electronic bill indicated by the reimbursement transaction, generates a reimbursable event, and stores the reimbursable event in the blockchain, so the reimbursement acceptor performs corresponding reimbursement. After the reimbursement acceptor completes the reimbursement, the expense splitting note is automatically generated based on reimbursement information broadcasted by the reimbursement acceptor to the blockchain.

However, regardless of whether the target transaction is an expense splitting transaction or a reimbursement transaction, the target transaction includes information about invoking the smart contract. As shown in FIG. 4, the From field of the target transaction is used to record an address of an account that initiates the invoking of the smart contract, the To field of the target transaction is used to record an address of the invoked smart contract, and the Data field of the target transaction is used to record a method and a parameter for invoking the smart contract. Certainly, the target transaction can further include different information based on different transactions. These are merely examples of the target transaction, and target transaction is not specifically limited here.

The following describes in detail the previous two methods of generating the respective expense splitting notes.

Method 1

As such, after receiving the reimbursement transaction initiated by the reimbursement initiator, the network node on the blockchain performs processing related to the reimbursement (for example, reimbursement criteria verification and broadcasting of a reimbursable event), and stores the reimbursement information broadcasted by the reimbursement acceptor to the blockchain after completing the reimbursement. The network node on the blockchain can automatically generate respective expense splitting notes after monitoring the expense splitting transaction initiated by the reimbursement acceptor.

During implementation, each electronic bill and reimbursement information of the electronic bill are stored in the blockchain. The following describes the origin of the reimbursement information.

The reimbursement initiator can broadcast a reimbursement transaction to the blockchain, where the reimbursement transaction includes an identifier of a target electronic bill to be reimbursed.

After the network node on the blockchain monitors the reimbursement transaction stored in the blockchain, the network node can invoke the reimbursement logic specified in the smart contract deployed on the blockchain to perform reimbursement verification on the reimbursement initiator.

The reimbursement logic can be specifically program codes (for example, some program methods or functions that can be invoked) specified in the smart contract and related to the execution logic for performing reimbursement verification on the reimbursement initiator. For a procedure for creating and invoking the smart contract, refer to the previous procedure for creating and invoking the smart contract. Details are omitted here.

Specifically, the network node on the blockchain can invoke the reimbursement logic in the smart contract deployed on the blockchain to check whether the target electronic bill stored in the blockchain satisfies the reimbursement criteria.

In practice, the previous reimbursement criteria can include: reimbursement permission criteria of the reimbursement initiator, reimbursement amount criteria, etc. These are merely examples of the reimbursement criteria, and the reimbursement criteria are not specifically limited.

For example, for the reimbursement permission criteria of the reimbursement initiator, the network node on the blockchain can check whether the reimbursement initiator has the reimbursement permission for the target electronic bill. For example, whether the reimbursement initiator is a payer of the target electronic bill; whether the reimbursement initiator is an employee of the reimbursement acceptor, etc.

For example, the previous reimbursement transaction can include a user identifier of the reimbursement initiator. When performing reimbursement permission verification on the reimbursement initiator, the network node on the blockchain can first determine a user identifier of a payer in the target electronic bill, and then check whether the user identifier of the initiator and the user identifier of the payer are consistent. If consistent, the network node on the blockchain can determine that the reimbursement permission verification on the reimbursement initiator succeeds.

For the reimbursement amount criteria, a remaining reimbursement amount of each reimbursement initiator is maintained on the blockchain. The network node on the blockchain can check whether the reimbursement amount in the target electronic bill is less than the remaining reimbursement amount of the reimbursement initiator. If the reimbursement amount in the target electronic bill is less than the remaining reimbursement amount of the reimbursement initiator, it is determined that the target electronic bill satisfies the reimbursement criteria.

For example, the network node on the blockchain can locally maintain the remaining reimbursement amount of the reimbursement initiator. Assume that the remaining reimbursement amount of the reimbursement initiator is RMB 10,000. In this case, when performing reimbursement amount verification on the reimbursement initiator, the network node on the blockchain can determine whether the amount in the target electronic bill is less than the remaining reimbursement amount of the reimbursement initiator. Assume that the amount in the target electronic bill is RMB 1,000 and is less than the remaining reimbursement amount of the maintained reimbursement initiator, the network node on the blockchain can determine that verification on the reimbursement amount of the reimbursement initiator succeeds. In addition, the network node on the blockchain can update the remaining reimbursement amount of the maintained reimbursement initiator to RMB 9,000 for subsequent reimbursement amount verification.

In this embodiment, when determining that the target electronic bill satisfies the reimbursement criteria, the network node on the blockchain generates a reimbursable event that satisfies the reimbursement criteria for the target electronic bill, and broadcasts the reimbursable event to the blockchain for storage.

For example, transaction logs corresponding to each reimbursement transaction are also maintained on the blockchain. The transaction logs can store information related to the reimbursement transaction, such as electronic bills included in the reimbursement transaction.

When determining that the target electronic bill satisfies the reimbursement criteria, the network node on the blockchain can broadcast the reimbursable event to a transaction log corresponding to the reimbursement transaction on the blockchain for storage.

The reimbursement acceptor can monitor the log. After monitoring the reimbursable event in the transaction log, the reimbursement acceptor performs reimbursement processing locally, for example, transfers reimbursable expenses to the user account. After completing the reimbursement processing, the reimbursement acceptor can broadcast the reimbursement information to the blockchain for storage.

The reimbursement information can include a total reimbursement amount, reimbursed amount information, and unreimbursed amount information. Certainly, in practice, the reimbursement information can further include other content, such as a reimbursement time and a reimbursement acceptor for each reimbursement.

Based on the previous description, the blockchain stores the reimbursement information for the target electronic bill.

In addition, the reimbursement acceptor can broadcast an expense splitting transaction to the blockchain, where the expense splitting transaction includes the identifier of the target electronic bill.

After receiving the expense splitting transaction initiated by the reimbursement acceptor, the network node on the blockchain can invoke, in response to the expense splitting transaction, the expense splitting logic specified in the smart contract deployed on the blockchain. For example, the expense splitting logic can be: searching for reimbursement information corresponding to the identifier of the target electronic bill, generating respective expense splitting notes based on an unreimbursed amount included in the reimbursement information, and broadcasting, by the network node on the blockchain, the respective expense splitting notes to the blockchain for storage.

For example, assume that the reimbursement acceptor includes the healthcare security bureau and the insurance institution, the user first demands the reimbursement from the healthcare security bureau, and then demands the reimbursement from the insurance institution. Assume that the electronic bill to be reimbursed by the user is electronic bill 1, and a total reimbursement amount recorded in electronic bill 1 is RMB 100.

Based on electronic bill 1, the user terminal can construct reimbursement transaction 1 for the healthcare security bureau and broadcast reimbursement transaction 1 to the blockchain for storage.

After receiving reimbursement transaction 1, the network node on the blockchain can invoke the reimbursement logic specified in the smart contract deployed on the blockchain to determine whether electronic bill 1 included in the reimbursement transaction satisfies the reimbursement criteria. If electronic bill 1 satisfies reimbursement criteria 1, the network node on the blockchain can generate a reimbursable event that electronic bill 1 satisfies the reimbursement criteria, and broadcast the reimbursable event to a transaction log corresponding to the reimbursement transaction on the blockchain for storage.

The healthcare security bureau can monitor the transaction log. When monitoring the reimbursable event in the transaction log stored in the blockchain, the healthcare security bureau can perform reimbursement processing based on electronic bill 1 in the transaction log. For example, the healthcare security bureau can reimburse and transfer RMB 40 to the user account. After completing the reimbursement processing, the healthcare security bureau can broadcast the reimbursement information of electronic bill 1 (such as the total reimbursement amount RMB 100, the reimbursed amount RMB 40, and the unreimbursed amount RMB 60) to the blockchain for storage.

In addition, when an expense splitting note needs to be generated, the healthcare security bureau can broadcast an expense splitting transaction to the blockchain, where the expense splitting transaction includes the identifier of electronic bill 1. After receiving the expense splitting transaction, the network node on the blockchain can invoke, in response to the expense splitting transaction, the expense splitting logic specified in the smart contract deployed on the blockchain, to determine reimbursement information of electronic bill 1 in the reimbursement information stored in the blockchain, and generate expense splitting note 1 based on the unreimbursed amount (for example, RMB 60) in the reimbursement information.

The user terminal can obtain expense splitting note 1 from the blockchain, and then construct reimbursement transaction 2 based on expense splitting note 1, so the insurance institution can perform reimbursement processing based on expense splitting note 1.

Specifically, the user terminal can obtain expense splitting note 1 stored in the blockchain. When the user needs to initiate a reimbursement application to the insurance institution, the user can construct reimbursement transaction 2 for the insurance institution based on electronic bill 1 and expense splitting note 1. Reimbursement transaction 2 includes electronic bill 1 and expense splitting note 1. The user terminal can broadcast reimbursement transaction 2 to the blockchain for storage.

After receiving reimbursement transaction 2, the network node on the blockchain can invoke the reimbursement logic specified in the smart contract deployed on the blockchain to determine whether electronic bill 1 included in the reimbursement transaction satisfies the reimbursement criteria. If electronic bill 1 satisfies reimbursement criteria 1, the network node on the blockchain can generate a reimbursable event that electronic bill 1 satisfies the reimbursement criteria, and broadcast the reimbursable event to a transaction log corresponding to the reimbursement transaction on the blockchain for storage.

The insurance institution can monitor the transaction log. When monitoring the reimbursable event in the transaction log stored in the blockchain, the insurance institution can perform reimbursement processing based on electronic bill 1 and expense splitting note 1 stored in the blockchain. For example, the insurance institution can reimburse and transfer RMB 40 to the user, and then broadcast the reimbursement information (such as the total reimbursement amount RMB 100, the reimbursed amount RMB 40 from the healthcare security bureau, the reimbursed amount RMB 40 from the insurance institution, and the unreimbursed amount RMB 20) to the blockchain for storage.

In addition, when an expense splitting note needs to be generated, the insurance institution can broadcast an expense splitting transaction to the blockchain, where the expense splitting transaction includes the identifier of electronic bill 1.

After receiving the expense splitting transaction, the network node on the blockchain can invoke, in response to the expense splitting transaction, the expense splitting logic specified in the smart contract deployed on the blockchain, to determine reimbursement information of electronic bill 1 in the reimbursement information stored in the blockchain, generate expense splitting note 2 based on the unreimbursed amount (for example, RMB 20) in the reimbursement information, and broadcast expense splitting note 2 to the blockchain for storage.

Other insurance institutions can complete reimbursement based on electronic bill 1 and expense splitting note 2 in the previous method, and details are omitted here.

Method 2

As such, the network node on the blockchain can perform processing related to reimbursement (for example, reimbursement criteria verification) in response to a reimbursement transaction initiated by a reimbursement initiator, and automatically generate an expense splitting note based on an unreimbursed amount included in reimbursement information when monitoring the reimbursement information stored by a reimbursement acceptor in the blockchain after completing reimbursement.

During implementation, the reimbursement initiator broadcasts a reimbursement transaction to the blockchain, where the reimbursement transaction includes a target electronic bill.

After monitoring the reimbursement transaction stored in the blockchain, the network node on the blockchain can invoke, in response to the reimbursement transaction, the reimbursement logic specified in the smart contract deployed on the blockchain to determine whether the target electronic bill satisfies reimbursement criteria.

The previous reimbursement criteria are described above, and details are omitted here.

If the network node on the blockchain determines that the target electronic bill does not satisfy the reimbursement criteria, the network node returns a reimbursement failure prompt to the reimbursement acceptor, so as to prompt the user that the reimbursement fails. For example, the network node on the blockchain can return, to the user terminal, prompt information indicating that the reimbursement amount is not satisfied, cannot be reimbursed, or the reimbursement permission is not satisfied, so as to prompt the user that the reimbursement fails.

If determining that the target electronic bill satisfies the reimbursement criteria, the network node on the blockchain generates a reimbursable event that satisfies the reimbursement criteria for the target electronic bill, and broadcasts the reimbursable event to the blockchain for storage.

For example, transaction logs corresponding to each reimbursement transaction are also maintained on the blockchain. The transaction logs can store information related to the reimbursement transaction, such as electronic bills included in the reimbursement transaction.

When determining that the target electronic bill satisfies the reimbursement criteria, the network node on the blockchain can broadcast the reimbursable event to a transaction log corresponding to the reimbursement transaction on the blockchain for storage.

The reimbursement acceptor can monitor the log. After monitoring the reimbursable event in the transaction log, the reimbursement acceptor performs reimbursement processing locally, for example, transfers reimbursable expenses to the user account. After completing the reimbursement processing, the reimbursement acceptor can broadcast the reimbursement information to the blockchain for storage.

The network node on the blockchain can monitor reimbursement information that corresponds to the target electronic bill and that is stored in the blockchain after broadcasting the reimbursable event to the blockchain for storage.

If monitoring the reimbursement information corresponding to the target electronic bill, the network node on the blockchain further invokes the expense splitting logic specified in the smart contract deployed on the blockchain, and generates respective expense splitting notes based on an unreimbursed amount included in the reimbursement information.

If the reimbursement information stored in the blockchain is not monitored within predetermined monitoring duration, the network node on the blockchain returns prompt information indicating a reimbursement failure to the reimbursement acceptor.

For example, assume that the reimbursement acceptor includes the healthcare security bureau and the insurance institution, the user first demands the reimbursement from the healthcare security bureau, and then demands the reimbursement from the insurance institution. Assume that the electronic bill to be reimbursed by the user is electronic bill 1, and a total reimbursement amount recorded in electronic bill 1 is RMB 100.

Based on electronic bill 1, the user terminal can construct reimbursement transaction 1 for the healthcare security bureau and broadcast reimbursement transaction 1 to the blockchain for storage.

After receiving reimbursement transaction 1, the network node on the blockchain can invoke, in response to reimbursement transaction 1, the reimbursement logic specified in the smart contract deployed on the blockchain to determine whether electronic bill 1 included in reimbursement transaction 1 satisfies the reimbursement criteria.

If electronic bill 1 does not satisfy reimbursement criteria 1, the network node on the blockchain can return the prompt information indicating a reimbursement failure to the reimbursement acceptor.

If electronic bill 1 satisfies reimbursement criteria 1, the network node on the blockchain can generate reimbursable event 1 that electronic bill 1 satisfies the reimbursement criteria, and broadcast reimbursable event 1 to a transaction log corresponding to reimbursement transaction 1 on the blockchain for storage.

The healthcare security bureau can monitor the transaction log. When monitoring the reimbursable event in the transaction log, the healthcare security bureau can perform reimbursement processing based on electronic bill 1 stored in the blockchain. For example, the healthcare security bureau can reimburse and transfer RMB 40 to the user account. After completing the reimbursement processing, the healthcare security bureau can broadcast reimbursement information 1 of electronic bill 1 (such as the total reimbursement amount RMB 100, the reimbursed amount RMB 40, and the unreimbursed amount RMB 60) to the blockchain for storage.

The network node on the blockchain can monitor reimbursement information 1 that corresponds to electronic bill 1 and that is stored in the blockchain after broadcasting reimbursable event 1 to the blockchain for storage.

If the network node on the blockchain monitors reimbursement information 1, the network node generates expense splitting note 1 based on the unreimbursed amount (for example, RMB 60) in reimbursement information 1, and broadcasts expense splitting note 1 to the blockchain for storage.

The user terminal can obtain expense splitting note 1 from the blockchain, and then construct reimbursement transaction 2 based on expense splitting note 1, so the insurance institution can perform reimbursement processing based on expense splitting note 1.

Specifically, the user terminal can obtain expense splitting note 1 stored in the blockchain. When the user needs to initiate a reimbursement application to the insurance institution, the user can construct reimbursement transaction 2 for the insurance institution based on electronic bill 1 and expense splitting note 1. Reimbursement transaction 2 includes the identifier of electronic bill 1 and the identifier of expense splitting note 1. The user terminal can broadcast reimbursement transaction 2 to the blockchain for storage.

After receiving reimbursement transaction 2, the network node on the blockchain can invoke the reimbursement logic specified in the smart contract deployed on the blockchain to determine whether electronic bill 1 included in the reimbursement transaction satisfies the reimbursement criteria. If electronic bill 1 satisfies reimbursement criteria 1, the network node on the blockchain can generate a reimbursable event that electronic bill 1 satisfies the reimbursement criteria, and broadcast the reimbursable event to a transaction log corresponding to the reimbursement transaction on the blockchain for storage. The transaction log further stores the identifier of electronic bill 1, the identifier of expense splitting note 1, etc.

The insurance institution can monitor the transaction log. When monitoring the reimbursable event in the transaction log stored in the blockchain, the insurance institution can perform reimbursement processing based on electronic bill 1 and expense splitting note 1 stored in the blockchain. For example, the insurance institution can reimburse and transfer RMB 40 to the user, and then broadcast reimbursement information 2 (such as the total reimbursement amount RMB 100, the reimbursed amount RMB 40 from the healthcare security bureau, the reimbursed amount RMB 40 from the insurance institution, and the unreimbursed amount RMB 20) to the blockchain for storage.

After the network node on the blockchain monitors reimbursement information 2, the network node generates expense splitting note 2 based on the unreimbursed amount (for example, RMB 20) in reimbursement information 2, and broadcasts expense splitting note 2 to the blockchain for storage.

The user can further initiate a reimbursement application to other insurance institutions, and the other insurance institutions can complete the reimbursement based on electronic bill 1 and expense splitting note 2 in the previous method. Details are omitted here.

It can be seen from the previous description that, the network node on the blockchain can invoke, in response to the target transaction that includes the target electronic bill identifier, the expense splitting logic specified in the smart contract deployed on the blockchain, and generate the respective expense splitting notes based on the unreimbursed amount included in the reimbursement information that is stored in the blockchain and that corresponds to the target electronic bill identifier, so the user can independently issue the respective expense splitting notes by invoking the smart contract on the blockchain.

On the other hand, because data stored in the blockchain has a non-tampering feature, it is difficult to tamper with the reimbursement information and the expense splitting note stored in the blockchain, and the data has higher authenticity Furthermore, the blockchain is used to associate electronic bills, reimbursement information, and expense splitting notes used by the user to apply to each reimbursement acceptor for reimbursement, so a reimbursement track of the user can be traced on the blockchain.

Corresponding to the previous method embodiments, the present specification further provides an embodiment of a blockchain-based reimbursement splitting apparatus.

Figure 6:
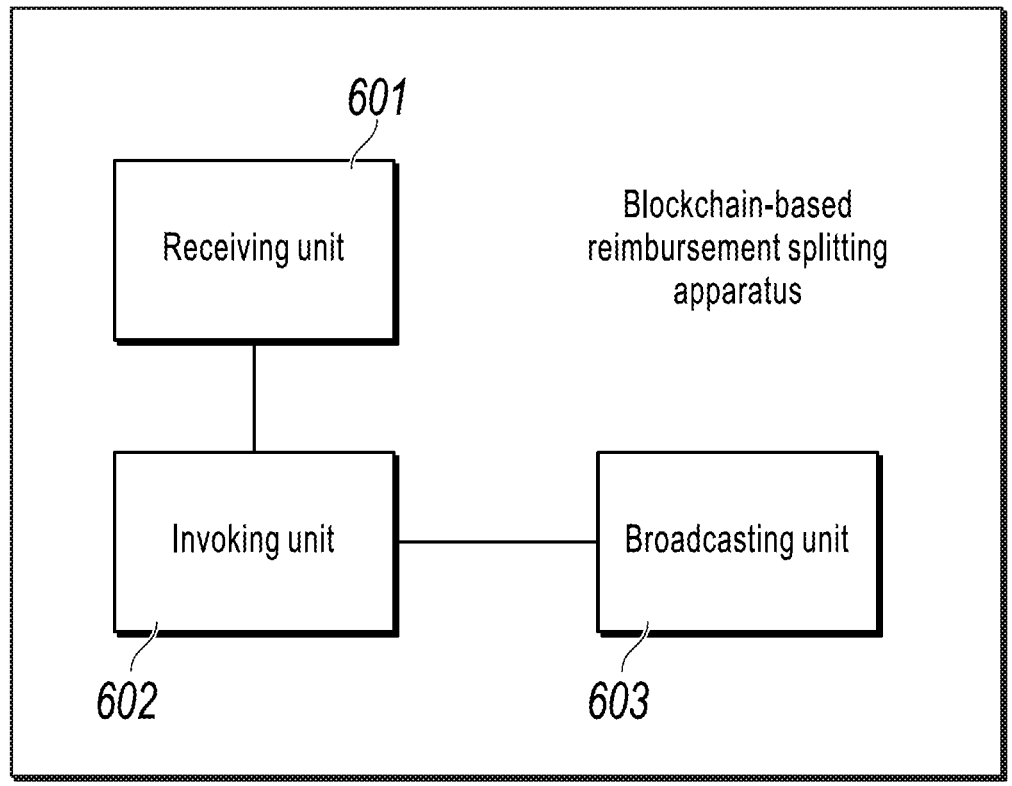
FIG. 6 is a block diagram illustrating a blockchain-based reimbursement splitting apparatus, according to an example embodiment of the present specification.

Referring to FIG. 6, FIG. 6 is a block diagram illustrating a blockchain-based reimbursement splitting apparatus, according to an example embodiment of the present specification. The apparatus can include: a receiving unit 601, configured to receive a target transaction, where the target transaction includes a target electronic bill identifier; an invoking unit 602, configured to: invoke, in response to the target transaction, an expense splitting logic specified in a smart contract deployed on the blockchain, and generate respective expense splitting notes based on an unreimbursed amount included in reimbursement information that is stored in the blockchain and that corresponds to the target electronic bill identifier; and a broadcasting unit 603, configured to broadcast the respective expense splitting notes to the blockchain for storage.

Optionally, the target transaction is an expense splitting transaction initiated by a reimbursement acceptor, and the blockchain stores reimbursement information of an electronic bill; and the invoking unit 602 is configured to search for the reimbursement information that is stored in the blockchain and that corresponds to the target electronic bill identifier; and generate the respective expense splitting notes based on the unreimbursed amount in the found reimbursement information.

Optionally, the target transaction is a reimbursement transaction initiated by a reimbursement initiator, and the blockchain stores a target electronic bill corresponding to the reimbursement transaction; and the invoking unit 602 is configured to: invoke, in response to the target transaction, a reimbursement logic specified in the smart contract deployed on the blockchain to determine whether the target electronic bill satisfies reimbursement criteria; if the target electronic bill satisfies the reimbursement criteria, generate a reimbursable event that the target electronic bill satisfies the reimbursement criteria, and broadcast the reimbursable event to the blockchain for storage, so when monitoring the reimbursable event stored in the blockchain, a reimbursement acceptor performs reimbursement processing on the target electronic bill and broadcasts the reimbursement information to the blockchain for storage; and further invoke, in response to monitoring the reimbursement information stored in the blockchain, the expense splitting logic specified in the smart contract deployed on the blockchain, and generate the respective expense splitting notes based on the unreimbursed amount included in the reimbursement information.

Optionally, the invoking unit 602 is configured to: if the reimbursement information stored in the blockchain is not monitored within predetermined monitoring duration, return prompt information indicating a reimbursement failure to the reimbursement acceptor.

Optionally, the invoking unit 602 is configured to: if the target electronic bill does not satisfy the reimbursement criteria, return prompt information indicating a reimbursement failure to the reimbursement acceptor.

In addition, the present specification further provides an electronic device that a blockchain-based reimbursement splitting apparatus is located.

Figure 7:
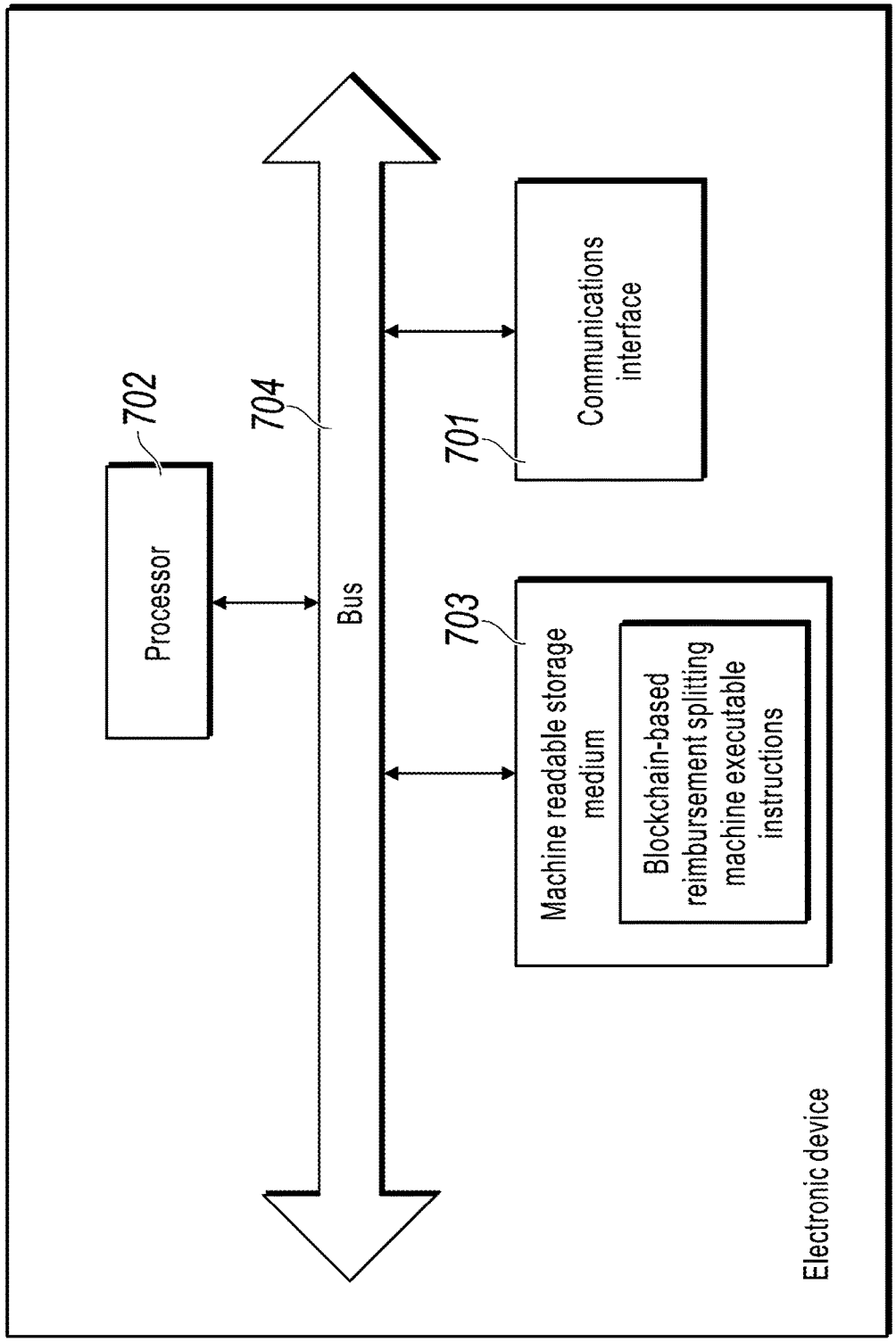
FIG. 7 is a structural hardware diagram illustrating an electronic device that a blockchain-based reimbursement splitting apparatus is located, according to an example embodiment of the present specification.

Referring to FIG. 7, FIG. 7 is a structural hardware diagram illustrating an electronic device that a blockchain-based reimbursement splitting apparatus is located, according to an example embodiment of the present specification.

The electronic device includes a communications interface 701, a processor 702, a machine readable storage medium 703, and a bus 704. The communications interface 701, the processor 702, and the machine readable storage medium 703 communicate with each other by using the bus 704. By reading and executing machine executable instructions that are in the machine readable storage medium 703 and that are corresponding to a control logic of blockchain-based reimbursement splitting, the processor 702 can execute the previous blockchain-based reimbursement splitting method.

The machine readable storage medium 703 mentioned in the present specification can be any electronic, magnetic, optical, or another physical storage apparatus, and can include or store information, such as executable instructions, data, etc. For example, the machine readable storage medium can be a volatile memory, a non-volatile memory, or a similar storage medium. Specifically, the machine readable storage medium 703 can be a random access memory (RAM), a flash memory, a storage drive (such as a hard disk drive), a solid state disk, any type of storage disk (such as an optical disc or a DVD), a similar storage medium, or a combination thereof.

By reading and executing the machine executable instructions that are stored in the memory and that are corresponding to a control logic of block-chain-based reimbursement splitting, the processor is enabled to: receive a sent target transaction, where the target transaction includes a target electronic bill identifier; invoke, in response to the target transaction, an expense splitting logic specified in a smart contract deployed on the blockchain, and generate respective expense splitting notes based on an unreimbursed amount included in reimbursement information that is stored in the blockchain and that corresponds to the target electronic bill identifier; and broadcast the respective expense splitting notes to the blockchain for storage.

Optionally, the target transaction is an expense splitting transaction initiated by a reimbursement acceptor, and the blockchain stores reimbursement information of an electronic bill; and at the time of generating respective expense splitting notes based on an unreimbursed amount included in reimbursement information that is stored in the blockchain and that corresponds to the target electronic bill identifier, the processor is enabled to: search for the reimbursement information that is stored in the blockchain and that corresponds to the target electronic bill identifier; and generate the respective expense splitting notes based on the unreimbursed amount in the found reimbursement information.

Optionally, the target transaction is a reimbursement transaction initiated by a reimbursement initiator, and the blockchain stores a target electronic bill corresponding to the reimbursement transaction; and at the time of invoking, in response to the target transaction, an expense splitting logic specified in a smart contract deployed on the blockchain, and generating respective expense splitting notes based on an unreimbursed amount included in reimbursement information that is stored in the blockchain and that corresponds to the target electronic bill identifier, the processor is enabled to: invoke, in response to the target transaction, a reimbursement logic specified in the smart contract deployed on the blockchain to determine whether the target electronic bill satisfies reimbursement criteria; if the target electronic bill satisfies the reimbursement criteria, generate a reimbursable event that the target electronic bill satisfies the reimbursement criteria, and broadcast the reimbursable event to the blockchain for storage, so when monitoring the reimbursable event stored in the blockchain, a reimbursement acceptor performs reimbursement processing on the target electronic bill and broadcasts the reimbursement information to the blockchain for storage; and further invoke, in response to monitoring the reimbursement information stored in the blockchain, the expense splitting logic specified in the smart contract deployed on the blockchain, and generate the respective expense splitting notes based on the unreimbursed amount included in the reimbursement information.

Optionally, by reading and executing the machine executable instructions that are stored in the memory and that are corresponding to a control logic of block-chain-based reimbursement splitting, the processor is further enabled to: if the reimbursement information stored in the blockchain is not monitored within predetermined monitoring duration, return prompt information indicating a reimbursement failure to the reimbursement acceptor.

Optionally, by reading and executing the machine executable instructions that are stored in the memory and that are corresponding to a control logic of block-chain-based reimbursement splitting, the processor is further enabled to: if the target electronic bill does not satisfy the reimbursement criteria, return prompt information indicating a reimbursement failure to the reimbursement acceptor.

For an implementation process of functions and roles of each unit in the apparatus, references can be made to an implementation process of corresponding steps in the previous method. Details are omitted here.

Because an apparatus embodiment corresponds to a method embodiment, for related parts, references can be made to related descriptions in the method embodiment. The previously described apparatus embodiment is merely an example. The units described as separate parts can or cannot be physically separate, and parts displayed as units can or cannot be physical units, can be located in one position, or can be distributed on a plurality of network units. Some or all of the modules can be selected based on actual requirements to achieve the objectives of the solutions of the present specification. A person of ordinary skill in the art can understand and implement the embodiments of the present application without creative efforts.

The system, apparatus, module, or unit illustrated in the previous embodiments can be implemented by using a computer chip or an entity, or can be implemented by using a product having a certain function. A typical implementation device is a computer, and the computer can be a personal computer, a laptop computer, a cellular phone, a camera phone, a smartphone, a personal digital assistant, a media player, a navigation device, an email receiving and sending device, a game console, a tablet computer, a wearable device, or any combination of these devices.

In a typical configuration, the computer includes one or more processors (CPU), an input/output interface, a network interface, and a memory.

The memory can include a non-persistent memory, a random access memory (RAM), and/or a non-volatile memory in a computer readable medium, for example, a read-only memory (ROM) or a flash memory (flash RAM). The memory is an example of the computer readable medium.

The computer readable medium includes persistent, non-persistent, movable, and unmovable media that can store information by using any method or technology. The information can be a computer readable instruction, a data structure, a program module, or other data. Examples of a computer storage medium include but are not limited to a phase change random access memory (PRAM), a static RAM (SRAM), a dynamic RAM (DRAM), a RAM of another type, a read-only memory (ROM), an electrically erasable programmable ROM (EEPROM), a flash memory or another memory technology, a compact disc ROM (CD-ROM), a digital versatile disc (DVD) or another optical storage, a cassette tape, a magnetic disk storage, a quantum memory, a storage medium based on grapheme, another magnetic storage device, or any other non-transmission medium. The computer storage medium can be used to store information that can be accessed by the computing device. As described in the present application, the computer readable medium does not include computer readable transitory media such as a modulated data signal and a carrier.

It is worthwhile to further note that, the terms "include", "contain", or their any other variants are intended to cover a non-exclusive inclusion, so a process, a method, a product or a device that includes a list of elements not only includes those elements but also includes other elements which are not expressly listed, or further includes elements inherent to such process, method, product or device. Without more constraints, an element preceded by "includes a . . . " does not preclude the existence of additional identical elements in the process, method, product or device that includes the element.

Specific embodiments of the present specification are described above. Other embodiments fall within the scope of the appended claims. In some situations, the actions or steps described in the claims can be performed in an order different from the order in the embodiments and the desired results can still be achieved. In addition, the process depicted in the accompanying drawings does not necessarily need a particular execution order to achieve the desired results. In some embodiments, multi-tasking and concurrent processing is feasible or can be advantageous.

Terms used in one or more embodiments of the present specification are merely used to describe specific embodiments, and are not intended to limit the one or more embodiments of the present specification. The terms "a" and "the" of singular forms used in one or more embodiments of the present specification and the appended claims are also intended to include plural forms, unless otherwise specified in the context clearly. It should be further understood that the term "and/or" used in the present specification indicates and includes any or all possible combinations of one or more associated listed items.

It should be understood that although terms "first", "second", "third", etc. can be used in one or more embodiments of the present specification to describe various types of information, the information is not limited to these terms. These terms are only used to differentiate between information of the same type. For example, without departing from the scope of one or more embodiments of the present specification, first information can also be referred to as second information, and similarly, the second information can be referred to as the first information. Depending on the context, for example, the word "if" used here can be explained as "while", "when", or "in response to determining".

The previous descriptions are only example embodiments of one or more embodiments of the present specification, but are not intended to limit the one or more embodiments of the present specification. Any modification, equivalent replacement, improvement, etc. made without departing from the spirit and principle of the one or more embodiments of the present specification shall fall within the protection scope of the one or more embodiments of the present specification.

The previous descriptions are merely preferred embodiments of the present specification, but are not intended to limit the present specification. Any modification, equivalent replacement, or improvement made without departing from the spirit and principle of the present specification shall fall within the protection scope of the present specification.

What is claimed is:

1. A computer-implemented method for blockchain-based reimbursement splitting, wherein the method is performed by a network node on a blockchain network comprising a blockchain, and the computer-implemented method comprises:
   receiving, by the network node, a target transaction, wherein the target transaction comprises a target electronic bill identifier for a target electronic bill for a reimbursement initiator and an address for a smart contract that is deployed in the blockchain, wherein the smart contract comprises computer-executable code that comprises expense splitting logic for the target electronic bill and reimbursement logic for the target electronic bill; and
   in response to receiving the target transaction:
      invoking, by the network node, the expense splitting logic specified in the smart contract deployed on the blockchain;
      generating, by the network node using the expense splitting logic, respective expense splitting notes for a plurality of additional reimbursement acceptors based on an unreimbursed amount remaining after a first reimbursement acceptor reimbursed a partial amount of a total reimbursement amount, the generating including searching the blockchain for reimbursement information using the target electronic bill identifier and obtaining the unreimbursed amount from the reimbursement information that is stored in the blockchain and that corresponds to the target electronic bill identifier, wherein the respective expense splitting note for each additional reimbursement acceptor indicates a respective portion of the unreimbursed amount for the additional reimbursement acceptor; and
      broadcasting, by the network node, the respective expense splitting notes to the blockchain for storage;
      updating, in the blockchain and based on the respective expense splitting notes, a remaining reimbursement amount for the reimbursement initiator;
   after updating the remaining reimbursement amount for the reimbursement initiator in the blockchain, monitoring, by the network node, for a new reimbursement transaction comprising the target electronic bill identifier to be stored in the blockchain;
   in response to detecting, based on the monitoring, the new reimbursement transaction comprising the target electronic bill identifier being stored in the blockchain and receiving a given expense splitting note of the respective expense splitting notes, triggering reimbursement logic specified in the smart contract deployed on the blockchain;
   determining, by the network node using the reimbursement logic specified in the smart contract deployed on the blockchain, that reimbursement of a given portion of the unreimbursed amount indicated by the given expense splitting note satisfies reimbursement criteria based on the given portion being less than or equal to the remaining reimbursement amount for the reimbursement initiator; and
   in response to determining that the reimbursement of the given portion of the unreimbursed amount indicated by the given expense splitting note satisfies the reimbursement criteria, broadcasting, by the network node to the blockchain, a reimbursable event that enables a given additional reimbursement acceptor corresponding to the given expense splitting note to complete reimbursement of the given portion of the unreimbursed amount.

2. The computer-implemented method of claim 1, wherein:
   the target transaction is an expense splitting transaction initiated by the first reimbursement acceptor; and
   generating the respective expense splitting notes for the plurality of additional reimbursement acceptors based on the unreimbursed amount remaining after the first reimbursement acceptor reimbursed the partial amount of the total reimbursement amount comprises:
generating the respective expense splitting notes based on a found unreimbursed amount included in found reimbursement information that is found as a result of the searching.

3. The computer-implemented method of claim 1, wherein:
the target transaction is a reimbursement transaction initiated by a reimbursement initiator, and the blockchain stores a target electronic bill corresponding to the reimbursement transaction; and
invoking the expense splitting logic specified in the smart contract deployed on the blockchain, and generating the respective expense splitting notes for the plurality of additional reimbursement acceptors based on the unreimbursed amount remaining after the first reimbursement acceptor reimbursed the partial amount of the total reimbursement amount comprises:
invoking, in response to receiving the target transaction, the reimbursement logic specified in the smart contract deployed on the blockchain to determine whether the target electronic bill satisfies the reimbursement criteria; and
in response to determining that the target electronic bill satisfies the reimbursement criteria:
generating a first reimbursable event that satisfies the reimbursement criteria, and broadcasting the first reimbursable event to the blockchain for storage such that, when monitoring the first reimbursable event stored in the blockchain, the first reimbursement acceptor performs reimbursement processing on the target electronic bill and broadcasts the reimbursement information to the blockchain for storage; and
further invoking, in response to monitoring the reimbursement information stored in the blockchain, the expense splitting logic specified in the smart contract deployed on the blockchain, and generating the respective expense splitting notes based on the unreimbursed amount included in the reimbursement information.

4. The computer-implemented method of claim 3, further comprising:
determining that the reimbursement information stored in the blockchain is not monitored within a predetermined monitoring duration; and
in response to determining that the reimbursement information stored on the blockchain is not monitored within the predetermined monitoring duration, returning, to the first reimbursement acceptor, prompt information indicating a reimbursement failure.

5. The computer-implemented method of claim 3, further comprising:
determining that the target electronic bill does not satisfy the reimbursement criteria; and
in response to determining that the target electronic bill does not satisfy the reimbursement criteria, returning, to the first reimbursement acceptor, prompt information indicating a reimbursement failure.

6. A non-transitory, computer-readable medium storing one or more instructions executable by a computer system to perform operations comprising:
receiving, by a network node on a blockchain network comprising a blockchain, a target transaction, wherein the target transaction comprises a target electronic bill identifier for a target electronic bill for a reimbursement initiator and an address for a smart contract that is deployed in the blockchain, wherein the smart contract comprises computer-executable code that comprises expense splitting logic for the target electronic bill and reimbursement logic for the target electronic bill; and
in response to receiving the target transaction:
invoking, by the network node, the expense splitting logic specified in the smart contract deployed on the blockchain;
generating, by the network node using the expense splitting logic, respective expense splitting notes for a plurality of additional reimbursement acceptors based on an unreimbursed amount remaining after a first reimbursement acceptor reimbursed a partial amount of a total reimbursement amount, the generating including searching the blockchain for reimbursement information using the target electronic bill identifier and obtaining the unreimbursed amount from the reimbursement information that is stored in the blockchain and that corresponds to the target electronic bill identifier, wherein the respective expense splitting note for each additional reimbursement acceptor indicates a respective portion of the unreimbursed amount for the additional reimbursement acceptor; and
broadcasting, by the network node, the respective expense splitting notes to the blockchain for storage;
updating, in the blockchain and based on the respective expense splitting notes, a remaining reimbursement amount for the reimbursement initiator;
after updating the remaining reimbursement amount for the reimbursement initiator in the blockchain, monitoring, by the network node, for a new reimbursement transaction comprising the target electronic bill identifier to be stored in the blockchain;
in response to detecting, based on the monitoring, the new reimbursement transaction comprising the target electronic bill identifier being stored in the blockchain and receiving a given expense splitting note of the respective expense splitting notes, triggering reimbursement logic specified in the smart contract deployed on the blockchain;
determining, by the network node using the reimbursement logic specified in the smart contract deployed on the blockchain, that reimbursement of a given portion of the unreimbursed amount indicated by the given expense splitting note satisfies reimbursement criteria based on the given portion being less than or equal to the remaining reimbursement amount for the reimbursement initiator; and
in response to determining that the reimbursement of the given portion of the unreimbursed amount indicated by the given expense splitting note satisfies the reimbursement criteria, broadcasting, by the network node to the blockchain, a reimbursable event that enables a given additional reimbursement acceptor corresponding to the given expense splitting note to complete reimbursement of the given portion of the unreimbursed amount.

7. The non-transitory, computer-readable medium of claim 6, wherein:
the target transaction is an expense splitting transaction initiated by the first reimbursement acceptor; and
generating the respective expense splitting notes for the plurality of additional reimbursement acceptors based on the unreimbursed amount remaining after the first reimbursement acceptor reimbursed the partial amount of the total reimbursement amount comprises:

generating the respective expense splitting notes based on a found unreimbursed amount included in found reimbursement information that is found as a result of the searching.

8. The computer-implemented method of claim 1, wherein determining that the reimbursement of the given portion of the unreimbursed amount indicated by the given expense splitting note satisfies the reimbursement criteria comprises determining that a reimbursement initiator that initiated the new reimbursement transaction has reimbursement permission for a target electronic bill identified by the target electronic bill identifier.

9. The computer-implemented method of claim 1, wherein determining that the reimbursement of the given portion of the unreimbursed amount indicated by the given expense splitting note satisfies the reimbursement criteria comprises determining that the give portion of the unreimbursed amount indicated by the given expense splitting note is less than the unreimbursed amount included in the reimbursement information.

10. The non-transitory, computer-readable medium of claim 6, wherein:
the target transaction is a reimbursement transaction initiated by a reimbursement initiator, and the blockchain stores a target electronic bill corresponding to the reimbursement transaction; and
invoking the expense splitting logic specified in the smart contract deployed on the blockchain, and generating the respective expense splitting notes for the plurality of additional reimbursement acceptors based on the unreimbursed amount remaining after the first reimbursement acceptor reimbursed the partial amount of the total reimbursement amount comprises:
invoking, in response to receiving the target transaction, the reimbursement logic specified in the smart contract deployed on the blockchain to determine whether the target electronic bill satisfies the reimbursement criteria; and
in response to determining that the target electronic bill satisfies the reimbursement criteria:
generating a first reimbursable event that satisfies the reimbursement criteria, and broadcasting the first reimbursable event to the blockchain for storage such that, when monitoring the first reimbursable event stored in the blockchain, the first reimbursement acceptor performs reimbursement processing on the target electronic bill and broadcasts the reimbursement information to the blockchain for storage; and
further invoking, in response to monitoring the reimbursement information stored in the blockchain, the expense splitting logic specified in the smart contract deployed on the blockchain, and generating the respective expense splitting notes based on the unreimbursed amount included in the reimbursement information.

11. The non-transitory, computer-readable medium of claim 10, wherein the operations comprise:
determining that the reimbursement information stored in the blockchain is not monitored within a predetermined monitoring duration; and
in response to determining that the reimbursement information stored on the blockchain is not monitored within the predetermined monitoring duration, returning, to the first reimbursement acceptor, prompt information indicating a reimbursement failure.

12. The non-transitory, computer-readable medium of claim 10, wherein the operations comprise:
determining that the target electronic bill does not satisfy the reimbursement criteria; and
in response to determining that the target electronic bill does not satisfy the reimbursement criteria, returning, to the first reimbursement acceptor, prompt information indicating a reimbursement failure.

13. A computer-implemented system, comprising:
one or more computers of a network node on a blockchain network comprising a blockchain; and
one or more computer memory devices interoperably coupled with the one or more computers and having tangible, non-transitory, machine-readable media storing one or more instructions that, when executed by the one or more computers, perform operations comprising:
receiving, by a network node, a target transaction, wherein the target transaction comprises a target electronic bill identifier for a target electronic bill for a reimbursement initiator and an address for a smart contract that is deployed in the blockchain, wherein the smart contract comprises computer-executable code that comprises expense splitting logic for the target electronic bill and reimbursement logic for the target electronic bill; and
in response to receiving the target transaction:
invoking, by the network node, the expense splitting logic specified in the smart contract deployed on the blockchain;
generating, by the network node using the expense splitting logic, respective expense splitting notes for a plurality of additional reimbursement acceptors based on an unreimbursed amount remaining after a first reimbursement acceptor reimbursed a partial amount of a total reimbursement amount, the generating including searching the blockchain for reimbursement information using the target electronic bill identifier and obtaining the unreimbursed amount from the reimbursement information that is stored in the blockchain and that corresponds to the target electronic bill identifier, wherein the respective expense splitting note for each additional reimbursement acceptor indicates a respective portion of the unreimbursed amount for the additional reimbursement acceptor; and
broadcasting, by the network node, the respective expense splitting notes to the blockchain for storage;
updating, in the blockchain and based on the respective expense splitting notes, a remaining reimbursement amount for the reimbursement initiator;
after updating the remaining reimbursement amount for the reimbursement initiator in the blockchain, monitoring, by the network node, for a new reimbursement transaction comprising the target electronic bill identifier to be stored in the blockchain;
in response to detecting, based on the monitoring, the new reimbursement transaction comprising the target electronic bill identifier being stored in the blockchain and receiving a given expense splitting note of the respective expense splitting notes, triggering reimbursement logic specified in the smart contract deployed on the blockchain;
determining, by the network node using the reimbursement logic specified in the smart contract deployed on the blockchain, that reimbursement of a given portion of the unreimbursed amount indicated by the given expense splitting note satisfies reimbursement criteria based on the given portion being less than or equal to the remaining reimbursement amount for the reimbursement initiator; and in response to determining that the reimbursement of the given portion of the unreimbursed amount indicated by the given expense splitting note satisfies the reimbursement criteria, broadcasting, by the network node to the blockchain, a reimbursable event that enables a given additional reimbursement acceptor corresponding to the given expense splitting note to complete reimbursement of the given portion of the unreimbursed amount.

14. The computer-implemented system of claim 13, wherein:

the target transaction is an expense splitting transaction initiated by the first reimbursement acceptor; and generating the respective expense splitting notes for the plurality of additional reimbursement acceptors based on the unreimbursed amount remaining after the first reimbursement acceptor reimbursed the partial amount of the total reimbursement amount comprises:

searching the blockchain for the reimbursement information; and generating the respective expense splitting notes based on a found unreimbursed amount included in found reimbursement information that is found as a result of the searching.

15. The computer-implemented system of claim 13, wherein:

the target transaction is a reimbursement transaction initiated by a reimbursement initiator, and the blockchain stores a target electronic bill corresponding to the reimbursement transaction; and invoking the expense splitting logic specified in the smart contract deployed on the blockchain, and generating the respective expense splitting notes for the plurality of additional reimbursement acceptors based on the unreimbursed amount remaining after the first reimbursement acceptor reimbursed the partial amount of the total reimbursement amount comprises:

invoking, in response to receiving the target transaction, the reimbursement logic specified in the smart contract deployed on the blockchain to determine whether the target electronic bill satisfies the reimbursement criteria; and in response to determining that the target electronic bill satisfies the reimbursement criteria:

generating a first reimbursable event that satisfies the reimbursement criteria, and broadcasting the first reimbursable event to the blockchain for storage such that, when monitoring the first reimbursable event stored in the blockchain, the first reimbursement acceptor performs reimbursement processing on the target electronic bill and broadcasts the reimbursement information to the blockchain for storage; and further invoking, in response to monitoring the reimbursement information stored in the blockchain, the expense splitting logic specified in the smart contract deployed on the blockchain, and generating the respective expense splitting notes based on the unreimbursed amount included in the reimbursement information.

16. The computer-implemented system of claim 15, wherein the operations comprise:

determining that the reimbursement information stored in the blockchain is not monitored within a predetermined monitoring duration; and in response to determining that the reimbursement information stored on the blockchain is not monitored within the predetermined monitoring duration, returning, to the first reimbursement acceptor, prompt information indicating a reimbursement failure.

17. The computer-implemented system of claim 15, wherein the operations comprise:

determining that the target electronic bill does not satisfy the reimbursement criteria; and in response to determining that the target electronic bill does not satisfy the reimbursement criteria, returning, to the first reimbursement acceptor, prompt information indicating a reimbursement failure.

\* \* \* \* \*